(12) United States Patent
Gajowniczek

(10) Patent No.: US 12,286,894 B1
(45) Date of Patent: Apr. 29, 2025

(54) AIRCRAFT ENGINE ROTOR ASSEMBLY WITH GYROSCOPIC STIFFENER

(71) Applicant: PRATT & WHITNEY CANADA CORP., Longueuil (CA)

(72) Inventor: Krzysztof Gajowniczek, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/589,832

(22) Filed: Feb. 28, 2024

(51) Int. Cl.
*F01D 5/02* (2006.01)

(52) U.S. Cl.
CPC ........ *F01D 5/027* (2013.01); *F05D 2220/323* (2013.01); *F05D 2260/30* (2013.01)

(58) Field of Classification Search
CPC ........... F01D 5/027; F01D 25/00; F01D 25/04
See application file for complete search history.

(56) References Cited

U.S. PATENT DOCUMENTS

| 2,804,323 A | 8/1957 | Morley et al. |
| 4,193,741 A | 3/1980 | Briggs |
| 8,984,940 B2 | 3/2015 | Josefczyk |

*Primary Examiner* — Christopher R Legendre
(74) *Attorney, Agent, or Firm* — NORTON ROSE FULBRIGHT CANADA LLP

(57) ABSTRACT

A rotor assembly for an aircraft engine that includes a compressor rotor and a turbine rotor mounted to a shaft for rotation about a central axis, and a gyroscopic stiffener also mounted to shaft. The gyroscopic stiffener includes a gyroscopic disk extending radially away from the shaft and located at an axial position that is spaced apart from the bearings, and an attachment mechanism connecting the gyroscopic disk to the rotor assembly. The attachment mechanism allows the gyroscopic disk to move in one of two degrees of freedom relative to the shaft, the two degrees of freedom including a rotational degree of freedom wherein the gyroscopic disk is rotatable at a greater rotational speed that a remainder of the rotor assembly, and an angular degree of freedom wherein the gyroscopic disk is orientated at a precession deflection angle relative to the plane and/or the central axis.

20 Claims, 7 Drawing Sheets

AIRCRAFT ENGINE ROTOR ASSEMBLY WITH GYROSCOPIC STIFFENER

TECHNICAL FIELD

The application relates generally to rotating spools in aircraft engines and, more particularly, to stiffening structures for such rotating spools.

BACKGROUND

Aircraft engines include rotor assemblies, often referred to as "spools", which typically comprise a compressor rotor and a turbine rotor interconnected by a shaft. These rotating spools may however include a number of rotors, whether they be compressor rotors, turbine rotors, or a combination of the two.

Such spools used in modern aircraft engines tend to be lighter and more flexible than they were in the past. As such, it can be desirable to want to increase the stiffness of these rotating assemblies such as to accurately control the frequency of the rotor's bending mode and critical speed.

SUMMARY

There is accordingly provided a rotor assembly for an aircraft engine, the rotor assembly comprising: a compressor rotor and a turbine rotor mounted to a shaft for rotation about a central axis, and two bearings mounted on the shaft for rotatably supporting the rotor assembly within the aircraft engine; and a gyroscopic stiffener including: a gyroscopic disk extending radially away from the shaft and defining a plane normal to the central axis, the gyroscopic disk located at an axial position that is spaced apart from the bearings; and an attachment mechanism connecting the gyroscopic disk to the rotor assembly, the attachment mechanism allowing the gyroscopic disk to move in one of two degrees of freedom relative to the shaft, the two degrees of freedom including a rotational degree of freedom wherein the gyroscopic disk is rotatable at a greater rotational speed that a remainder of the rotor assembly, and an angular degree of freedom wherein the gyroscopic disk is orientated at a precession deflection angle relative to the plane and/or the central axis.

The rotor assembly as defined above and described herein may further include one or more of the following features, in whole or in part, and in any combination.

In certain aspects, the precession deflection angle is greater than an angular deflection of the shaft caused by bending during operation of the rotor spool.

In certain aspects, the precession deflection angle is more than 2 times the angular deflection of the shaft caused by bending.

In certain aspects, the precession deflection angle is more than 10 times the angular deflection of the shaft caused by bending.

In certain aspects, a radially outer rim of the gyroscopic disk is located radially inwardly of an inner gaspath-facing surface on the compressor rotor or the turbine rotor.

In certain aspects, the axial position corresponds to a location on the rotor assembly having a highest expected lateral displacement caused by bending of the rotor spool during operation of the aircraft engine.

In certain aspects, the axial position of the gyroscopic disk is disposed between the compressor rotor and the turbine rotor.

In certain aspects, the axial position of the gyroscopic disk is disposed between the two bearings.

In certain aspects, the axial position of the gyroscopic disk is forward of a most-forward one of the two bearings.

In certain aspects, the gyroscopic disk is located an axial distance of more than one shaft diameter away from a closest one of the bearings.

In certain aspects, the attachment mechanism includes a bearing or an elastic joint.

In certain aspects, the rotor assembly has a first mass, and the gyroscopic disk has a second mass, the second mass being less than 10% of the first mass.

There is also provided an aircraft engine comprising: a rotor assembly including a shaft mounted in bearings for rotation about a central axis, the rotor spool including a compressor rotor and a turbine rotor mounted on the shaft for rotation therewith, the compressor rotor and the turbine rotor having respective blades exposed to a main gaspath of the aircraft engine; a gyroscopic disk mounted to the rotor assembly at an axial position thereon that is spaced apart from the bearings, the gyroscopic disk extending radially outward form the central axis within a plane disposed normal to the central axis, the gyroscopic disk being located radially inwardly from an inner gaspath boundary of the main gaspath; and wherein, in response to a bending of the rotor assembly during operation of the aircraft engine, the gyroscopic disk being actuated to: angularly tilt away from the plane by a precession deflection angle different than an angular deflection of the rotor assembly caused by the bending; and/or rotate relative to the rotor assembly at an angular velocity different than that of the shaft.

The aircraft engine as defined above and described herein may further include one or more of the following features, in whole or in part, and in any combination.

In certain aspects, in response to a bending of the rotor assembly during operation of the aircraft engine, the gyroscopic disk is actuated to: angularly tilt away from the plane by the precession deflection angle, the precession deflection angle being greater than the angular deflection of the rotor assembly caused by the bending; and/or rotate relative to the rotor assembly at the angular velocity, the angular velocity being greater than that of the shaft.

In certain aspects, a radially outer rim of the gyroscopic disk is located radially inwardly of an inner gaspath-facing surface on the compressor rotor or the turbine rotor.

In certain aspects, the axial position corresponds to a location where the shaft has a highest expected lateral displacement caused by bending of the rotor assembly during operation of the aircraft engine.

In certain aspects, the axial position of the gyroscopic disk is disposed: between the compressor rotor and the turbine rotor; and/or between two of the bearings.

In certain aspects, the gyroscopic disk is located an axial distance of more than one shaft diameter away a closest one of the bearings.

In certain aspects, the gyroscopic disk is connected to the rotor assembly by an attachment mechanism, the attachment mechanism including a bearing or an elastic joint.

There is further provided a method of stiffening a rotor spool in an aircraft engine, the rotor spool including a compressor rotor and a turbine rotor mounted to a shaft for rotation therewith about a central axis, the method comprising: providing a gyroscopic disk mounted to the rotor spool and extending radially away from the shaft in a plane normal to the central axis, the gyroscopic disk located at an axial position that is spaced apart from bearings supporting the shaft within the aircraft engine; and in response to a lateral displacement of the shaft of the rotor spool during operation of the aircraft engine: angularly tilting the gyroscopic disk away from the plane by a precession deflection angle different than an angular deflection of the shaft caused by the bending; and/or rotating the gyroscopic disk at an angular velocity different than that of the shaft.

BRIEF DESCRIPTION OF THE DRAWINGS

Reference is now made to the accompanying figures in which.

DETAILED DESCRIPTION

Figure 1:
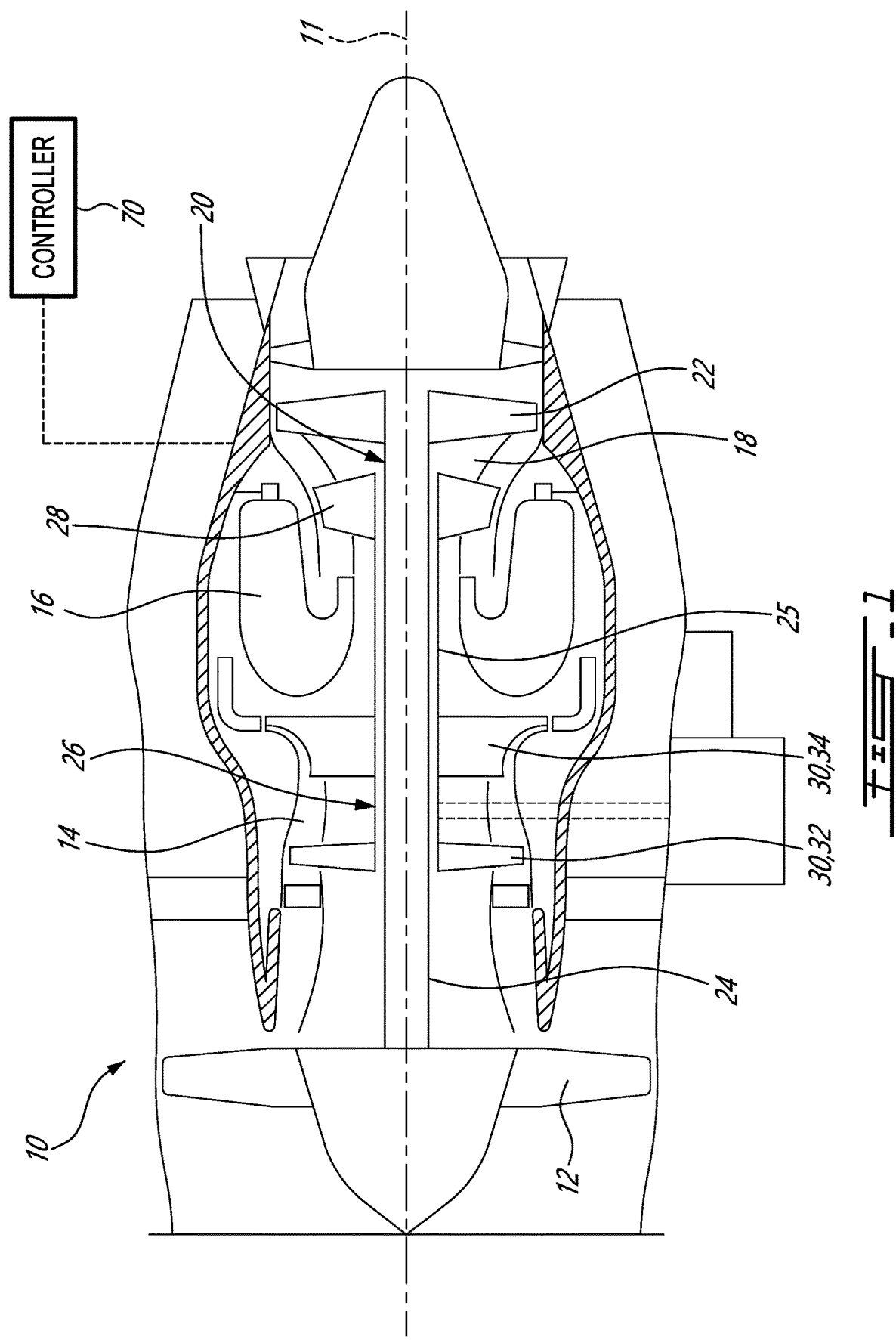
FIG. 1 is a schematic cross-sectional view of an aircraft engine.

FIG. 1 illustrates an aircraft powerplant or aircraft engine 10 of a type preferably provided for use in subsonic flight. The aircraft engine 10 as depicted in FIG. 1 is a gas turbine engine, and more particularly still a turbofan. It is however to be understood that the aircraft engine 10 as described herein may include a thermal engine, an electric motor, or a combination of these. The thermal engine may include a gas turbine engine or other thermal engine suitable for use in aircraft. The aircraft engine 10 in the exemplary embodiment of FIG. 1 generally comprises in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The aircraft engine (or simply "engine") 10 as described herein includes one or more rotor assemblies, which may also be referred to herein as "spools", that form part of the engine 10. Each of these spools typically comprises a compressor rotor and/or a turbine rotor, and rotates about a central axis 11. The configuration of each spool will depend on the engine architecture, and may for example include at least one compressor rotor and at least one turbine rotor interconnected by a shaft, or in certain alternate embodiments, they may include any number of rotors, whether they be compressor rotors, turbine rotors, or a combination of the two.

In the embodiment of FIG. 1, the engine 10 includes a low pressure spool 20 and a high pressure spool 26. The low pressure spool 20 includes a low pressure turbine 22 interconnected with the fan 12 by a low pressure shaft 24, and the high pressure spool 26 includes a high pressure turbine 28 interconnected with the one or more high pressure compressors 30 of the compressor section 14 by a high pressure shaft 25. The engine 10 of FIG. 1 includes two high pressure compressors 30, namely an axial compressor 32 and a circumferential compressor 34 located downstream of the axial compressor 32. In a particular embodiment, the high pressure shaft 25 is hollow and the low pressure shaft 24 extends therethrough, such that the two shafts are coaxial and free to rotate independently from one another about the same central axis 11.

Figure 2:
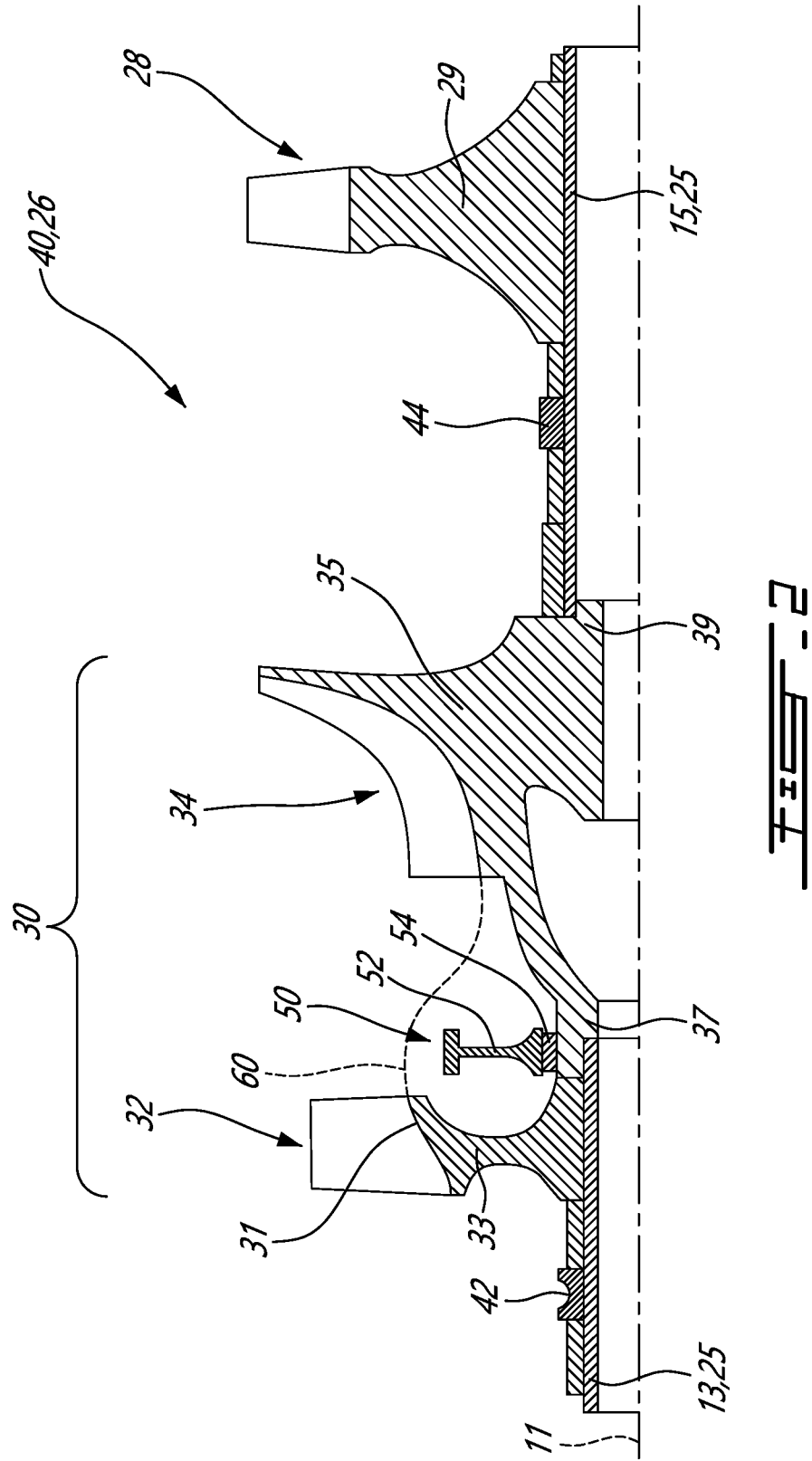
FIG. 2 is a schematic partial cross-sectional view of a rotor assembly of the aircraft engine of FIG. 1.

Referring now to FIG. 2, a rotor assembly 40 which forms a portion of the high pressure spool 26 of the engine 10 is shown. The axial compressor 32 includes an axial rotor 33 mounted to a first shaft segment 13 and the centrifugal compressor 34 includes an impeller 35 mounted at an upstream end 37 thereof to the first shaft segment 13 and/or to the axial rotor 33 for rotation therewith. The impeller 35 is also connected, at a downstream end 39 thereof, to a second shaft segment 15. The axial rotor 29 of the high pressure turbine 28 is also mounted to the second shaft segment 15. Although in the depicted embodiment the first shaft segment 13 and the second shaft segment 15 are two split shaft segments which together form part of the high pressure shaft 25, in other embodiments, the high pressure shaft 25 may be uninterrupted in which case the first and second shaft segments 13 and 15 simply form part of the uninterrupted high pressure shaft 25. Regardless of the configuration of the high pressure shaft 25, the entire rotor assembly 40 as shown in FIG. 2 rotates together about the central axis 11 as part of the high pressure spool 26.

Referring still to FIG. 2, the rotor assembly 40 also includes two (or more) bearings, and more particularly a first bearing 42 proximate to or within the compressor section 14 and a second bearing 44, downstream of the first bearing 42, that is proximate to or within the turbine section 18 of the engine 10. The first bearing 42 and the second bearing 44 (collectively, the "bearings" 42, 44) are mounted to the high pressure shaft 25 for rotatably supporting the rotor assembly 40 within the engine 10. More particularly, in the depicted embodiment the first bearing 42 is mounted to and rotatably supports the first shaft segment 13, and the second bearing is mounted to and rotatably supports the second shaft segment 15. It is to be understood that the bearings 42, 44 are depicted schematically in FIG. 2. Although various configurations of the rotor assembly 40 are possible, and may vary depending on the architecture and configuration of the engine 10, in the depicted embodiment the high pressure compressors 30 are axially located between the first bearing 42 and the second bearing 44, and the high pressure turbine 28 is axially located downstream of the second bearing 44.

Figure 3:
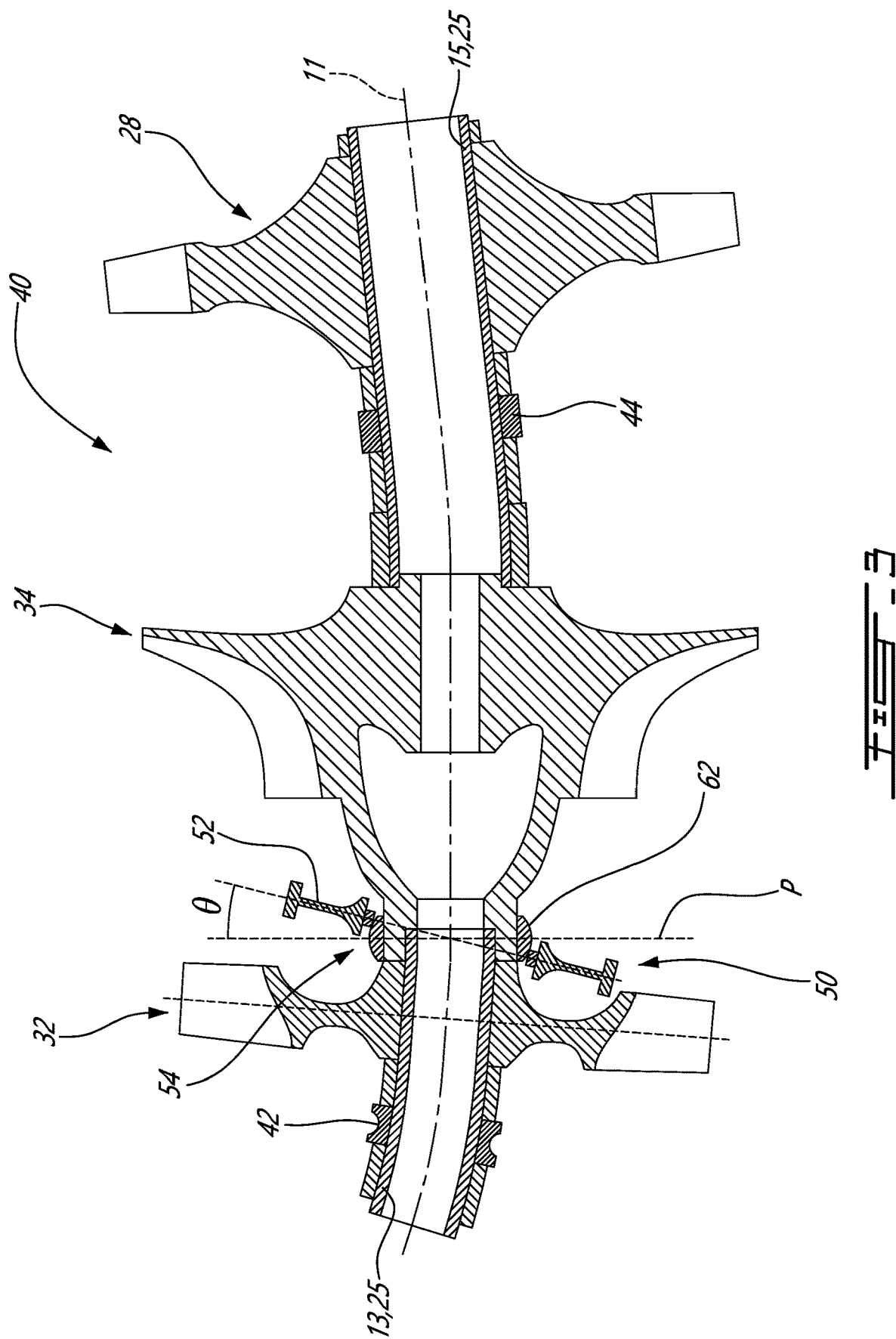
FIG. 3 is schematic partial cross-sectional view of the rotor assembly of FIG. 2, shown in a deflected position.

Under certain operating conditions, the rotor assembly 40 of the engine 10 may be subjected to loads and/or forces which will tend to cause the rotor assembly 40 to bend relative to the central axis 11, in the manner shown in FIG. 3. In order to counteract such loads and/or forces, the rotor assembly 40 is provided with a stiffening system and method for increasing the bending stiffness of the rotor assembly, which will increase the frequency of the rotor bending mode. More particularly, the rotor assembly 40 includes a gyroscopic stiffener 50 that is configured to control or modulate the rotor's critical speed, by moving the critical speed of the rotor assembly farther away from (and outside of) the operating range.

Referring still to FIG. 2, the rotor assembly 40 is accordingly provided with a gyroscopic stiffener 50, as will now be described in further detail. The gyroscopic stiffener 50 includes a gyroscopic disk 52 that extends, during normal operation of the engine 10 in the manner shown in FIG. 2, generally radially away from the high pressure shaft 25 and/or the first and second shaft segments 13, 15. In certain embodiments, the gyroscopic disk 52 is located at an axial position of the rotor assembly 40 that corresponds to an axial location on the rotor assembly 40 that has the highest expected lateral displacement caused by bending of the rotor assembly during periods of operation (see FIG. 3, which depicts such a state). While the most efficient axial location for the gyroscopic disk 52 may be where the rotor will have the highest lateral displacement (rather than highest deflection or bending), or where the rotor displacement is the highest. This may, in practice, not always be possible for a number of reasons, such as physical limitations caused by the engine architecture or configuration. In FIG. 3, for example, the ends of the shaft may displace the most however the gyroscopic disk is located more centrally due to physical constraints. The gyroscopic disk 52 located at this point is nevertheless is operable as intended and as described herein. The gyroscopic disk 52 may thus also be located on the shaft at a location where the shaft deflection is the highest. In certain other embodiments the gyroscopic disk 52 is located at an end of the engine shaft. For example, in certain turbofan engines having a fan driven by a low pressure rotor, it may be desirable to control the critical speed of the fan. In this case, the gyroscopic disk 52 can be positioned forward of the fan, and thus the gyroscopic disk 52 in this embodiment will overhang the bearings (i.e., the disk 52 is located axially forward of the most-forward one of the bearings supporting the rotor assembly).

It is to be appreciated however that certain physical limitations may exist with respect to placement of the gyroscopic disk 52 (e.g., space envelope, other engine structures, etc.) which may depend on the architecture and configuration of the specific engine. In certain embodiments, the gyroscopic disk 52 of the gyroscopic stiffener 50 is located at an axial position of the rotor assembly 40 that is spaced apart from the bearings 42, 44, given that the shaft(s) of the rotor assembly 40 will tend to be most rigidly supported at the locations of the bearings. The term "spaced apart" as used herein with respect to the axial spacing of the gyroscopic stiffener 50 relative to the bearings 42, 44 is understood to mean that the gyroscopic disk 52 is at least one shaft diameter away (in an axial direction) from at closest one of the bearings 42, 44. In certain embodiments, the gyroscopic disk 52 may be more than one shaft diameter away from the closest bearing 42, 44. As seen in FIG. 2, in the depicted embodiment the gyroscopic disk 52 of the gyroscopic stiffener 50 is disposed at an axial position that is between the first bearing 42 and the second bearing 44. More particularly, the gyroscopic disk 52 of the gyroscopic stiffener 50 is axially located between the two high pressure compressors 30, namely between the axial compressor 32 and the circumferential compressor 34, within the compressor section 14 of the engine 10.

The gyroscopic stiffener 50 also includes an attachment mechanism 54, as will now be described, which is used to connect the gyroscopic disk 52 to the remainder of the rotor assembly 40, whether the gyroscopic disk 52 is mounted directly to the high pressure shaft 25 (or one of the shaft segments 13, 15) or to a portion of one of the high pressure compressors 30 or other rotor mounted to the high pressure shaft 25.

The attachment mechanism 54 of the gyroscopic stiffener 50 serves to engage the gyroscopic disk 52 to the rotor assembly 40 while allowing the gyroscopic disc 52 to move relative to the high pressure shaft 25 in one of two degrees of freedom, namely either: a rotational degree of freedom, wherein the gyroscopic disk 52 is able to rotate independently from, and at a different (and higher) rotational speed than, the high pressure shaft 25; or an angular degree of freedom, wherein the gyroscopic disk 52 is able to be oriented at a non-normal angle θ relative to the high pressure shaft 25 (see FIG. 3).

Figure 4:
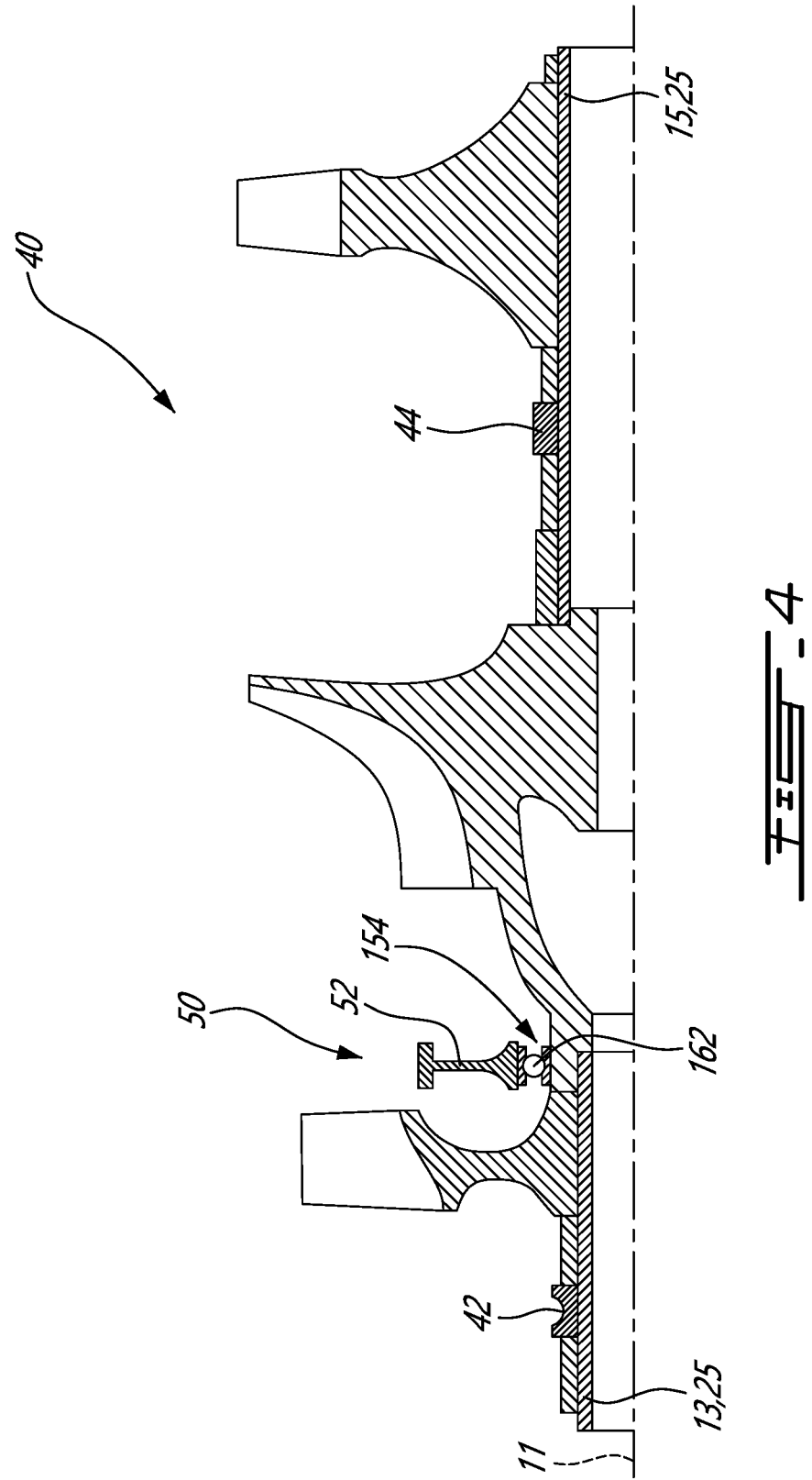
FIG. 4 is a schematic partial cross-sectional view of a rotor assembly of the aircraft engine of FIG. 1.

Referring now to FIG. 3 and FIG. 4, one of two different attachment mechanisms 54 (FIG. 3) and 154 (FIG. 4) may accordingly be selected to attach the gyroscopic disk 50 to the rotor assembly 40, such that the gyroscopic stiffener 50 works in one of two different ways to increase the bending stiffness of the rotor assembly 40.

In a first configuration, as depicted in FIG. 3, the attachment mechanism 54 is selected such that the gyroscope disk 52 is capable of being oriented at a non-normal angle θ relative to the axis 11 and/or relative to a plane P that is normal to the axis 11 and within which the gyroscopic disk 52 lies during normal operation of the rotor assembly 40. This angle θ defines a precession deflection angle of the gyroscopic disk 52. This precession deflection angle θ of the gyroscopic disk 52 will generate a gyroscopic moment that acts on the rotor assembly 40, causing it to want to return to a baseline or undeformed position—in much the same way a spinning wheel wants to remain upright due to gyroscopic moments and will tend to resist movement away from its baseline orientation. In this first configuration, the attachment mechanism 54 may include, for example, a spherical bearing 62 which permits such relative angular displacement between the gyroscopic disk 52 and the shaft 25 of the rotor assembly 40 (however it may restrict axial and torsional movement), and an actuator coupled to the gyroscopic disk 50 and configured for changing the orientation of the gyroscopic disk 52 relative to high pressure shaft 25. In this first configuration, it is possible but not necessary that the rotor disk 52 rotates relative to the remainder of the rotor assembly 40, and thus in such configuration the gyroscopic disk 52 may be rotatably fixed to the rotor assembly 40 such that the gyroscopic disk 52 rotates concurrently with, and at the same rotational speed as, the remainder of the rotor assembly 40. In another embodiment, instead of the spherical bearing 62 the attachment mechanism 54 may include an elastic joint which permits similar angular displacement between the gyroscopic disk 52 and the shaft 25 of the rotor assembly 40. Such an elastic joint may include, for example, a metal shield with reduced thickness at a certain radial distance, which will provide high radial and axial stiffness but low angular stiffness.

In certain embodiments, the attachment mechanism 54 is controlled such that the precession deflection angle θ is greater than an angular deflection of the shaft caused by bending during operation of the rotor assembly. In certain instances, the precession deflection angle θ may be selected to be more than 2 times the angular deflection of the shaft 25 caused by bending, optionally more than 5 times the angular deflection of the shaft 25 caused by bending, and more optionally still more than 10 times the angular deflection of the shaft 25 caused by bending.

In a second configuration, as depicted in FIG. 4, the attachment mechanism 154 may include a bearing 162 (which may be any kind of suitable bearing, whether roller bearing, ball bearing, sliding type bearing fed by oil or air/gas, etc.) and an actuator coupled to the gyroscopic disk 50 and configured for generating a rotation of the gyroscopic disk 50 relative to high pressure shaft 25, such that the gyroscopic disk 50 spins faster (i.e., at a greater rotational speed) than the shaft 25 and thus the remainder of the rotor assembly 40. The term "actuator" as used in this context is understood to mean a device capable of actuating (e.g., affecting angular displacement and/or rotation of) the gyroscopic disk 50 such as to move it in the manner described herein, and thus includes a device which is capable of generating continuous rotator of the gyroscopic disk 50. As such, the actuator may include a turbine or other rotary device, for example. In certain embodiments, the actuator (e.g., turbine or other mechanism) making the gyroscopic disk 50 spin at a faster rotational speed that the shaft may include for example a Tesla turbine feed by compressed air from a nozzle located on an engine casing close to the outside diameter of the gyroscopic disk 52.

This higher rotational speed of the gyroscopic disk 52 will generate a gyroscopic moment that acts on the rotor assembly 40, causing it to want to return to a baseline or undeformed position. Thus, in this second configuration, the gyroscopic disk 52 is able to move relative to the high pressure shaft 25 in a rotational degree of freedom, such that the gyroscopic disk 52 rotates independently from, and is caused to rotate at a higher rotational speed than, the high pressure shaft 25.

Figure 5:
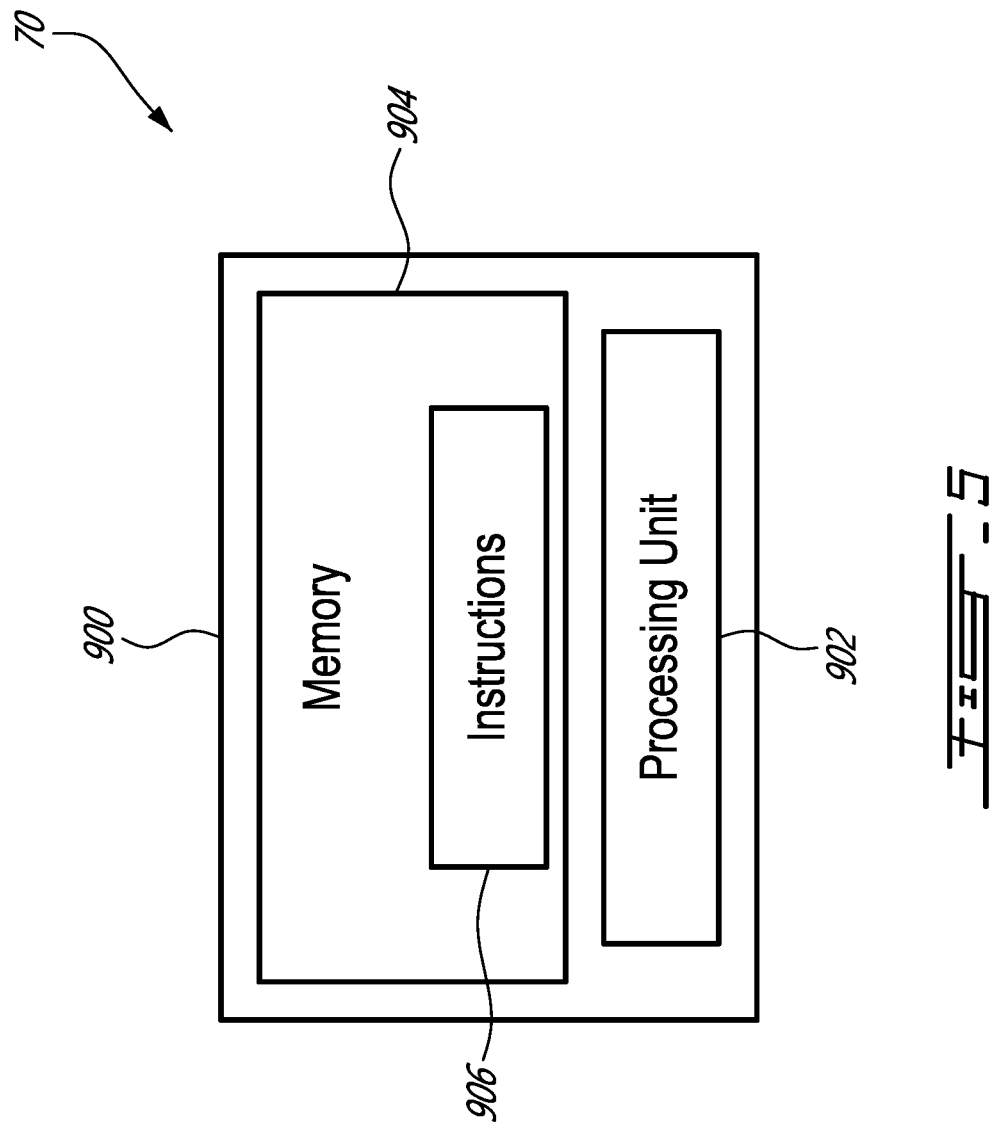
FIG. 5 is a schematic representation of a controller of the aircraft engine of FIG. 1, in accordance with an embodiment.

Accordingly, the aircraft engine 10, and more particularly a controller 70 (FIG. 1, FIG. 5) thereof, in response to a detected bending (or lateral displacement) of the rotor assembly 40 during operation of the aircraft engine, actuates the gyroscopic disk 52 of the gyroscopic stiffener to: angularly tilt the gyroscopic disk 52 away from the plane P by a precession deflection angle θ greater than an angular deflection of the shaft 25 of the rotor assembly 40 caused by the bending; and/or rotate the gyroscopic disk 52 at an angular velocity that is greater than that of the rest of the rotor assembly 40 (including the shaft 25). The controller 70 therefore is used as part of an active method of controlling the deflection angle and/or the rotational speed of the gyroscopic disk 52. In such an active method, using the controller 70, also detect rotor lateral displacement (instead of, or as well as, shaft bending) to provide signals to the actuator to move/deflect the gyroscopic disk as desired. This gives full control for the position of critical speed, within certain limits. This active system can work in both ways: it can increase or reduce the critical speed (reduction of critical speed can be done by applying opposite deflection angle to the gyroscopic disk). This possibility may be useful for rotors operating above critical speed, for which the crossing the critical speed generates increased level of vibrations.

In an alternate embodiment, however, the controlling the deflection angle and/or the rotational speed of the gyroscopic disk 52 may also be done passively—i.e., without the need for the controller 70. In such a passive method of controlling the deflection angle and/or the rotational speed of the gyroscopic disk 52, the deflection angle of the gyroscopic disk 52 is controlled by a mechanical device installed on the rotor. This device directly deflects the gyroscopic disk in response to shaft bending. Such a passive mechanism can provide a stiffening effect for the rotor assembly by moving the rotor bending mode farther from an operating speed. This may be a suitable mechanism for rotors, which typically always operate below a critical speed caused by bending mode.

In an another embodiment, the the gyroscopic stiffener 50 may, instead of the additional gyroscopic disk 50, be integrated directly into an existing rotor (e.g., a compressor rotor or a turbine rotor, etc.) of the rotor assembly 40 in the engine 10. For example, in this embodiment the gyroscopic rotor in question is mounted to the shaft using a spherical bearing or elastic joint, as described above, and the angular position of the rotor is controlled by the actuator as described above. In other words, the actuator of the gyroscopic stiffener in this embodiment will cause the compressor or turbine rotor to be angularly displaced. This angular displacement may be small enough not to unduly negatively impact the aerodynamic performance of the rotor, while still providing the gyroscopic benefits described herein to control or tune the critical speed of the rotor.

As described above, the gyroscopic stiffener 50 of the present disclosure uses the gyroscopic effect, which is responsible for generating a stiffening effect while the rotor assembly 40 is spinning. The bending moment generated by gyroscopic effect is described by following formula:

$$M = Ip * \omega 0 * \omega p$$

where: M=Gyroscopic bending moment; Ip=Polar moment of inertia; ω0=Rotational velocity; and ωp=Precession velocity. As will be appreciated from the formula, the gyroscopic moment generated depends on three components: the polar moment of inertia (Ip) of the rotating structure; the rotation speed (ω0); and the precession velocity (ωp).

It is possible to increase the polar moment of inertia, by making the gyroscopic disk relatively large and/or heavy. The radial size (e.g., outer diameter), shape and mass of the gyroscopic disk 52 may be selected to increase the the frequency of the bending mode of the rotor assembly 40, and thus modify the critical speed of the rotor (to move it further away from the expected operating range of the rotor). However, increasing the polar moment of inertia may not be desirable for certain aircraft engine applications where size and weight are typically at a premium. In certain embodiments of the present disclosure, the gyroscopic disk 52 may have a mass that is less than 10% of a total mass of the rotor assembly 40, and thus is relatively light relative thereto. In other embodiments, the gyroscopic disk 52 has a mass that is less than 5% of a total mass of the rotor assembly 40. In a further embodiment, the gyroscopic disk 52 has a mass that is less than 2% of a total mass of the rotor assembly 40. Additionally, in order to fit within a small space envelope, the outer diameter of the gyroscopic disk 52 may be selected such that the gyroscopic disk 52 fits radially inward of the main gas path of the compressor section 14 within the engine 10, defined by a gas path boundary 60 in FIG. 2. Stated differently, a radially outer rim 51 of the gyroscopic disk 52 is located radially inwardly of an inner gaspath boundary 60 of the compressor section 14 of the engine 10, which is substantially radially aligned with an inner gaspath-facing surface 31 of the axial rotor 33 of the low pressure compressor 32.

Consequently, the gyroscopic stiffener 50 of the present disclosure principally generates gyroscopic bending moment by increasing one or both of the other parameters, namely the rotation speed (ω0) and the precession velocity (ωp).

With respect to rotation speed (ω0) of the gyroscopic disc 52, this parameter can be increased by using the first configuration of the attachment mechanism 54 described above, wherein the rotational speed of the gyroscopic disk 52 is increased such that it rotates faster than the remainder of the rotor assembly 40.

With respect to precession velocity (ωp), or angular orientation of the spinning gyroscopic disk 52, this parameter can be increased by increasing the deflection angle of the gyroscopic disk 52 relative to rotor deflection, increasing in this way the entire gyroscopic effect. As seen in FIG. 3, the gyroscopic disk 52 is actuated such as to deflect more than the rotor deflection due to bending mode. The specific actuator or mechanism used to generate, control and/or modulate this precession deflection can be selected as suitable by a person skilled in the art.

Figure 6:
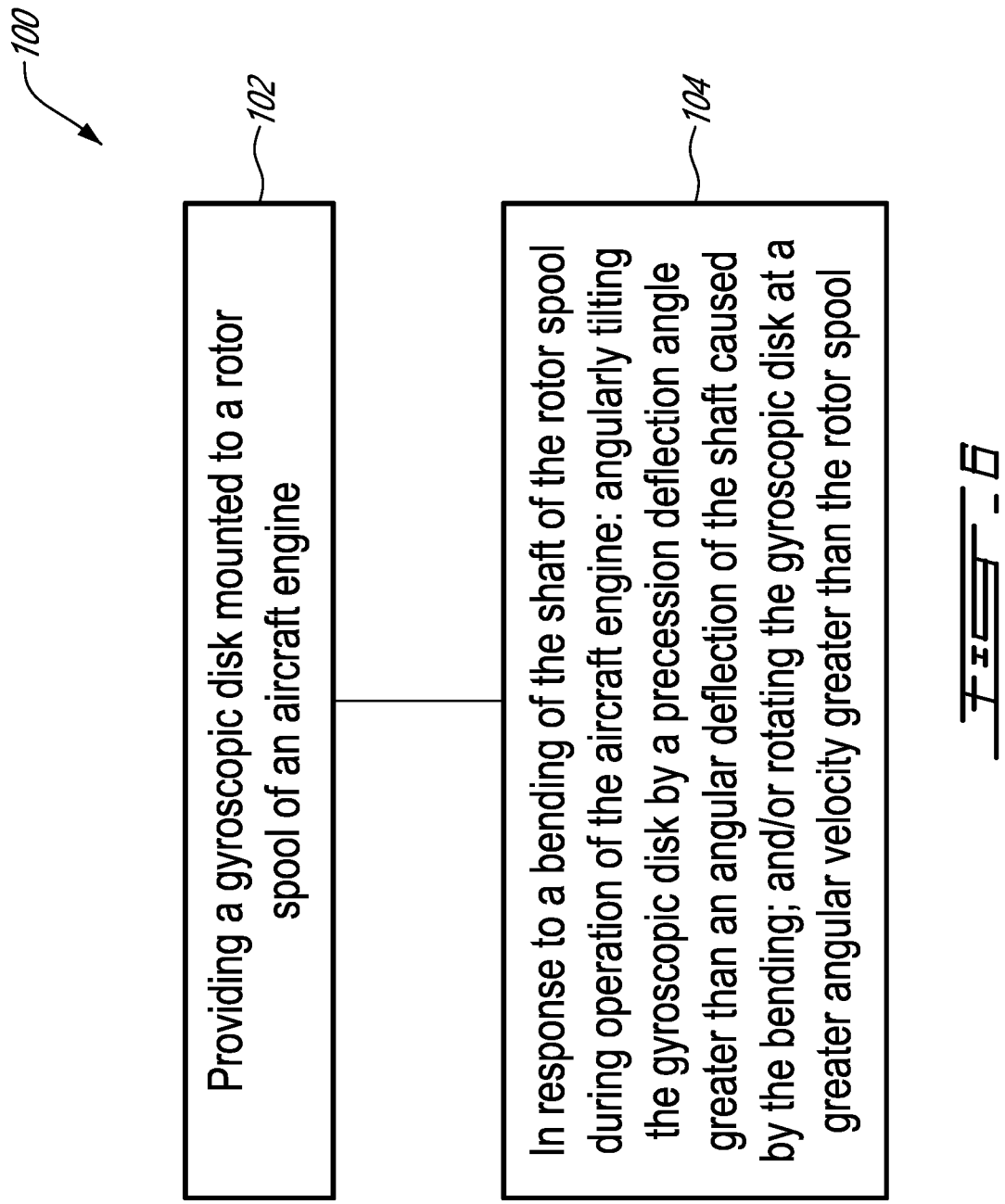
FIG. 6 depicts a method in accordance with aspects of the present disclosure.

Referring to FIG. 6, the gyroscopic stiffener 50 and controller 70 may also be implemented as part of a method 100, for example a method of stiffening a rotor spool, or the rotor assembly 40, in an aircraft engine. The method 100 includes, at step 102 providing the gyroscopic disk 52 mounted to the rotor assembly 40 and extending radially away from the shaft 25 in a plane P normal to the central axis 11, the gyroscopic disk 52 located at an axial position that is spaced apart from bearings 42, 44 supporting the shaft 25 within the aircraft engine 10. The method 100 also includes, at step 104, in response to a bending of the shaft 25 spool during operation of the aircraft engine 10, causing the gyroscopic disk 52 to: angularly tilt away from the plane P by a precession deflection angle θ greater than an angular deflection of the shaft caused by the bending; and/or rotate at a greater angular velocity than the shaft 25.

The method may also include, in another embodiment, tuning a critical rotational speed of the rotor assembly 40 in an aircraft engine 10, using a gyroscopic stiffener 50 having a gyroscopic disk mounted to the rotor assembly 40 by an attachment device 54, 154, such as to move the critical speed of the rotor assembly outside of an operating range of the aircraft engine 10.

Figure 7:
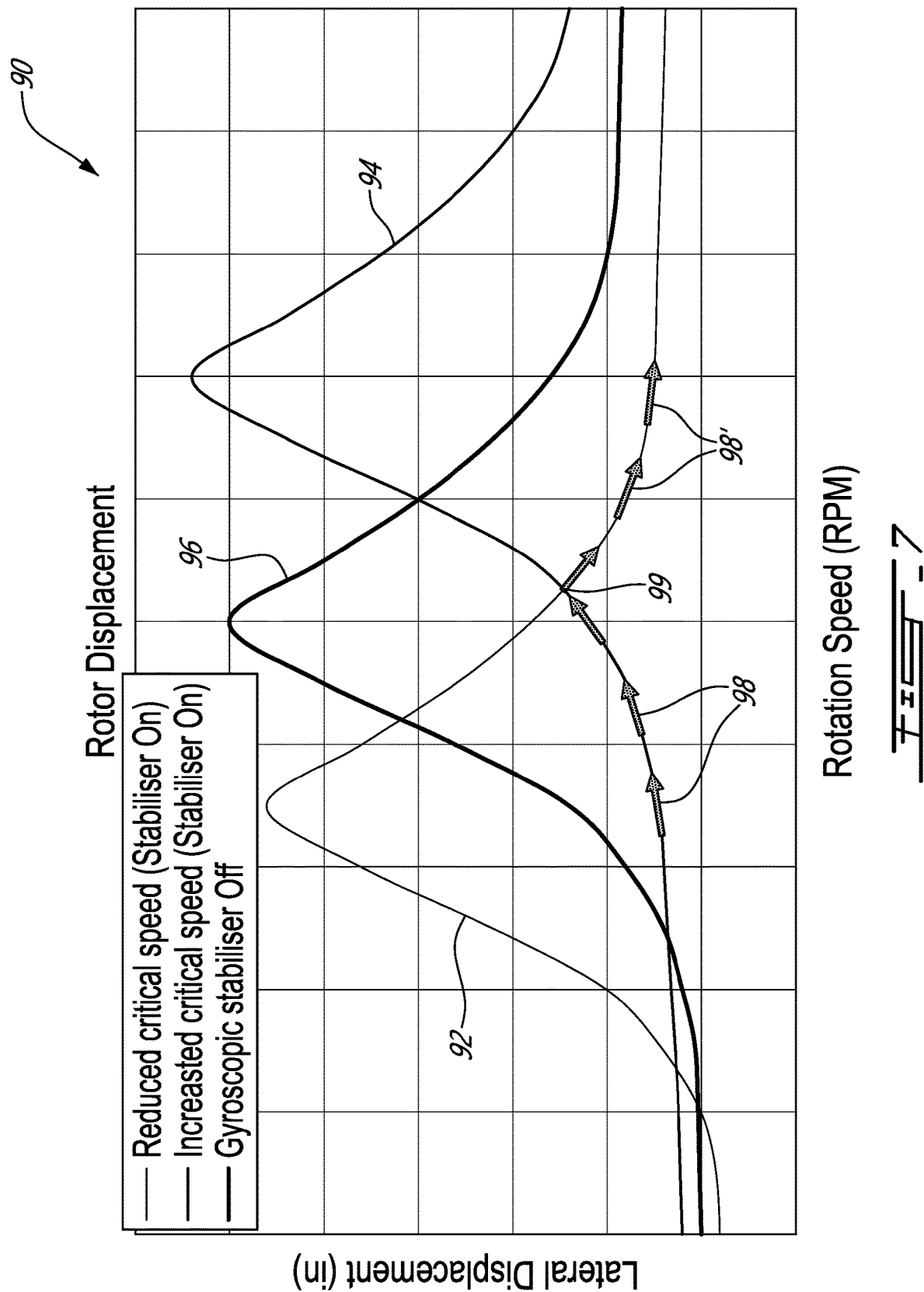
FIG. 7 depicts a graph showing the critical speed of an exemplary rotor assembly, with and without a gyroscopic stiffener as described herein, as a function of lateral displacement vs. rotational speed.

Referring to FIG. 7, the depicted graph 90 shows the critical speed of an exemplary rotor assembly 40, both with (lines 92 and 94—labeled as "Reduced critical speed (Stabiliser On)" and "Increased critical speed (Stabiliser On)", respectively) and without (line 96—labeled as "Gyroscopic stabiliser Off") a gyroscopic stiffener 50. The graph 90 shows rotational speed of the rotor assembly (e.g., in RPM) on the x-axis and lateral displacement of the rotor assembly (e.g., in inches) on the y-axis. As can be seen, the critical rotational speed of the rotor assembly 40 can be "tuned", by either decreasing (line 92) or increasing (line 94) the critical speed of the rotor by the addition or actuation of the gyroscopic stiffener 50. In other words, the critical speed of the rotor assembly can be shifted, either to a lower or higher speed by actuating the gyroscopic stiffener 50 as described herein. Instead of following line 96, which shows the critical speed when the gyroscopic stiffener 50 is not actuated, or is in an "off" position, by actuating the gyroscopic stiffener the critical speed of the rotor assembly can be shifted to a lower speed at 92 (towards the left on the graph) or towards a high speed 94 (towards the right on the graph). The rotor assembly 40 can accordingly be tuned such as to follow, as depicted by arrows 98, the first speed line 94 for a first portion of the speed range and then follow the second speed line 92 for a second, higher, portion of the speed range (following arrows 98'). The cross-over point 99 between these two speed lines occurs outside the range of the critical speed of the rotor.

With reference back to FIG. 5, an example of a computing device 900 is illustrated. For simplicity only one computing device 900 is shown but the system may include more computing devices 900 operable to exchange data. The computing devices 900 may be the same or different types of devices. The controller 70 and the method 100 described above may be implemented with one or more computing devices 900. Note that the controller 70 can be implemented as part of a full-authority digital engine controls (FADEC) or other similar device, including electronic engine control (EEC), engine control unit (ECU), electronic propeller control, propeller control unit, and the like. In some embodiments, the controller 70 is implemented as a Flight Data Acquisition Storage and Transmission system, such as a FASTTM system. The controller 70 may be implemented in part in the FASTTM system and in part in the EEC. Other embodiments may also apply.

The computing device 900 comprises a processing unit 902 and a memory 904 which has stored therein computer-executable instructions 906. The processing unit 902 may comprise any suitable devices configured to implement the method of operating the aircraft power plant such that instructions 906, when executed by the computing device 900 or other programmable apparatus, may cause the functions/acts/steps performed as part of the method of operating the aircraft power plant as described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

The methods and systems for of operating the aircraft power plant described herein may be implemented in a high level procedural or object oriented programming or scripting language, or a combination thereof, to communicate with or assist in the operation of a computer system, for example the computing device 900. Alternatively, the methods and systems for operating the aircraft power plant may be implemented in assembly or machine language. The language may be a compiled or interpreted language. Program code for implementing the methods and systems for operating the aircraft power plant may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the aircraft power plant may also be considered to be implemented by way of a non-transitory computer-readable storage medium having a computer program stored thereon. The computer program may comprise computer-readable instructions which cause a computer, or more specifically the processing unit 902 of the computing device 900, to operate in a specific and predefined manner to perform the functions described herein, for example those described in the method of operating the aircraft power plant.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although in the embodiments described above the gyroscopic stiffener 50 is located downstream of the axial low pressure compressor 32 within the compressor section 14 of the engine 10, it is to be understood that the gyroscopic stiffener 50 and more particularly the gyroscopic disk 52 thereof may be located elsewhere on the rotor assembly 40. For example, in another embodiment, the gyroscopic disk 52 may be located proximate to the fan 12. Yet further modifications could be implemented by a person of ordinary skill in the art in view of the present disclosure, which modifications would be within the scope of the present technology.

The invention claimed is:

1. A rotor assembly for an aircraft engine, the rotor assembly comprising:
   a compressor rotor and a turbine rotor mounted to a shaft for rotation about a central axis, and two bearings mounted on the shaft for rotatably supporting the rotor assembly within the aircraft engine; and
   a gyroscopic stiffener including:
   a gyroscopic disk extending radially away from the shaft and defining a plane normal to the central axis in an unbent state of the rotor assembly, the gyroscopic disk located at an axial position that is spaced apart from the bearings; and
   an attachment mechanism connecting the gyroscopic disk to the rotor assembly, the attachment mechanism allowing the gyroscopic disk to move in one of two degrees of freedom relative to the shaft, the two degrees of freedom including a rotational degree of freedom wherein the gyroscopic disk is rotatable at a greater rotational speed than a remainder of the rotor assembly, and an angular degree of freedom wherein the gyroscopic disk is orientated at a precession deflection angle relative to the plane and/or the central axis.

2. The rotor assembly as defined in claim 1, wherein the precession deflection angle is greater than an angular deflection of the shaft caused by bending during operation of the rotor assembly.

3. The rotor assembly as defined in claim 2, wherein the precession deflection angle is more than 2 times the angular deflection of the shaft caused by bending.

4. The rotor assembly as defined in claim 3, wherein the precession deflection angle is more than 10 times the angular deflection of the shaft caused by bending.

5. The rotor assembly as defined in claim 1, wherein a radially outer rim of the gyroscopic disk is located radially inwardly of an inner gaspath-facing surface on the compressor rotor or the turbine rotor.

6. The rotor assembly as defined in claim 1, wherein the axial position corresponds to a location on the rotor assembly having a highest expected lateral displacement caused by bending of the rotor assembly during operation of the aircraft engine.

7. The rotor assembly as defined in claim 1, wherein the axial position of the gyroscopic disk is disposed between the compressor rotor and the turbine rotor.

8. The rotor assembly as defined in claim 1, wherein the axial position of the gyroscopic disk is disposed between the two bearings.

9. The rotor assembly as defined in claim 1, wherein the axial position of the gyroscopic disk is forward of a most-forward one of the two bearings.

10. The rotor assembly as defined in claim 1, wherein the gyroscopic disk is located an axial distance of more than one diameter of the shaft away from a closest one of the bearings.

11. The rotor assembly as defined in claim 1, wherein the attachment mechanism includes a bearing or an elastic joint.

12. The rotor assembly as defined in claim 1, wherein the rotor assembly has a first mass, and the gyroscopic disk has a second mass, the second mass being less than 10% of the first mass.

13. An aircraft engine comprising:
a rotor assembly including a shaft mounted in bearings for rotation about a central axis, the rotor assembly including a compressor rotor and a turbine rotor mounted on the shaft for rotation therewith, the compressor rotor and the turbine rotor having respective blades exposed to a main gaspath of the aircraft engine;
a gyroscopic disk mounted to the rotor assembly at an axial position thereon that is spaced apart from the bearings, the gyroscopic disk extending radially outward form the central axis within a plane disposed normal to the central axis in an unbent state of the rotor assembly, the gyroscopic disk being located radially inwardly from an inner gaspath boundary of the main gaspath; and
wherein, in response to a bending of the rotor assembly during operation of the aircraft engine, the gyroscopic disk being actuated to:
angularly tilt away from the plane by a precession deflection angle different than an angular deflection of the rotor assembly caused by the bending;
and/or rotate relative to the rotor assembly at an angular velocity different than that of the shaft.

14. The aircraft engine as defined in claim 13, wherein
the precession deflection angle being greater than the angular deflection of the rotor assembly caused by the bending; and/or
the angular velocity being greater than that of the shaft.

15. The aircraft engine as defined in claim 13, wherein a radially outer rim of the gyroscopic disk is located radially inwardly of an inner gaspath-facing surface on the compressor rotor or the turbine rotor.

16. The aircraft engine as defined in claim 13, wherein the axial position corresponds to a location where the shaft has a highest expected lateral displacement caused by bending of the rotor assembly during operation of the aircraft engine.

17. The aircraft engine as defined in claim 13, wherein the axial position of the gyroscopic disk is disposed: between the compressor rotor and the turbine rotor; and/or between two of the bearings.

18. The aircraft engine as defined in claim 13, wherein the gyroscopic disk is located an axial distance of more than one diameter of the shaft away from a closest one of the bearings.

19. The aircraft engine as defined in claim 13, wherein the gyroscopic disk is connected to the rotor assembly by an attachment mechanism, the attachment mechanism including a bearing or an elastic joint.

20. A method of stiffening a rotor spool in an aircraft engine, the rotor spool including a compressor rotor and a turbine rotor mounted to a shaft for rotation therewith about a central axis, the method comprising:
providing a gyroscopic disk mounted to the rotor spool and extending radially away from the shaft in a plane normal to the central axis in an unbent state of the rotor assembly, the gyroscopic disk located at an axial position that is spaced apart from bearings supporting the shaft within the aircraft engine; and
in response to a lateral displacement of the shaft of the rotor spool during operation of the aircraft engine:
angularly tilting the gyroscopic disk away from the plane by a precession deflection angle different than an angular deflection of the shaft caused by the lateral displacement; and/or
rotating the gyroscopic disk at an angular velocity different than that of the shaft.

* * * * *